United States Patent [19]
Prince

[11] 3,826,391
[45] July 30, 1974

[54] ARTICULATED BOAT LAUNCHING TRAILER

[76] Inventor: Amos C. Prince, P.O. Box 894, Goldsboro, N.C. 27530

[22] Filed: Dec. 15, 1972

[21] Appl. No.: 315,374

[52] U.S. Cl.............................. 214/506, 214/83.24
[51] Int. Cl............................................... B60p 3/10
[58] Field of Search........ 214/505, 506, 517, 83.24, 214/84

[56] References Cited
UNITED STATES PATENTS

| | | | |
|---|---|---|---|
| 2,588,001 | 3/1952 | Holland | 214/505 |
| 3,140,003 | 7/1964 | Horner | 214/505 |
| 3,357,581 | 12/1967 | Scott | 214/505 |
| 3,376,987 | 4/1968 | Lohse | 214/505 |
| 3,472,406 | 10/1969 | Slipp | 214/505 |

Primary Examiner—Albert J. Makay
Attorney, Agent, or Firm—A. Yates Dowell, Jr.

[57] ABSTRACT

Apparatus for transporting, launching and retrieving boats or other marine vehicles including a trailer having telescoping frames and with one of such frames being articulated in a generally vertical direction to follow the contour of a launching ramp or the bottom of a body of water.

8 Claims, 9 Drawing Figures

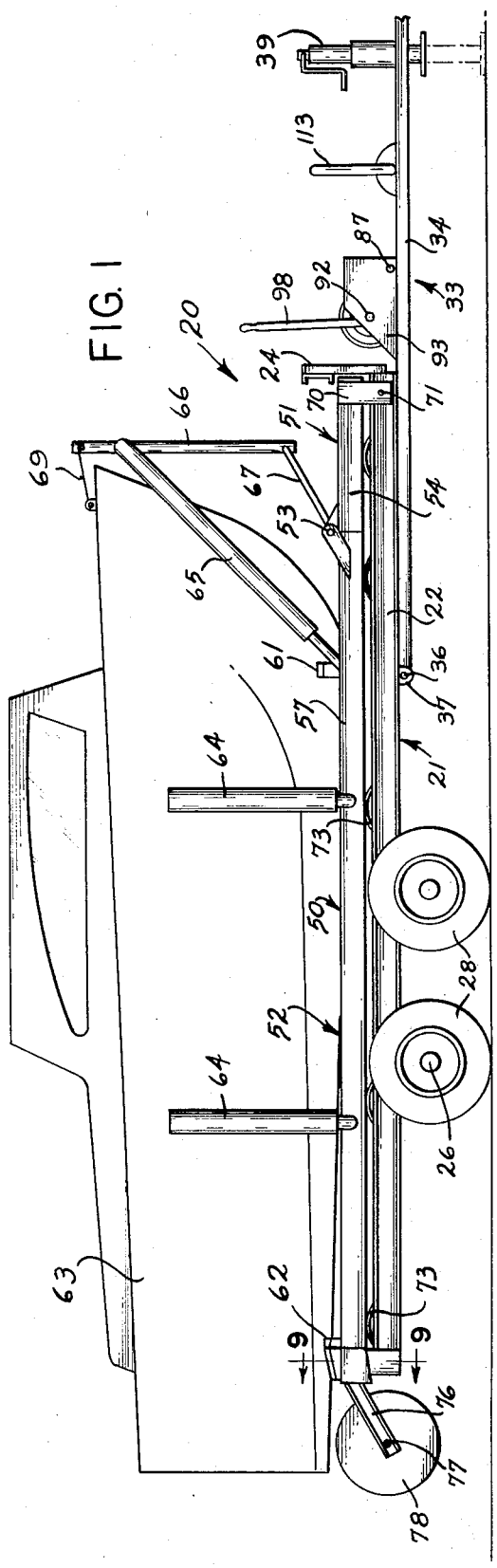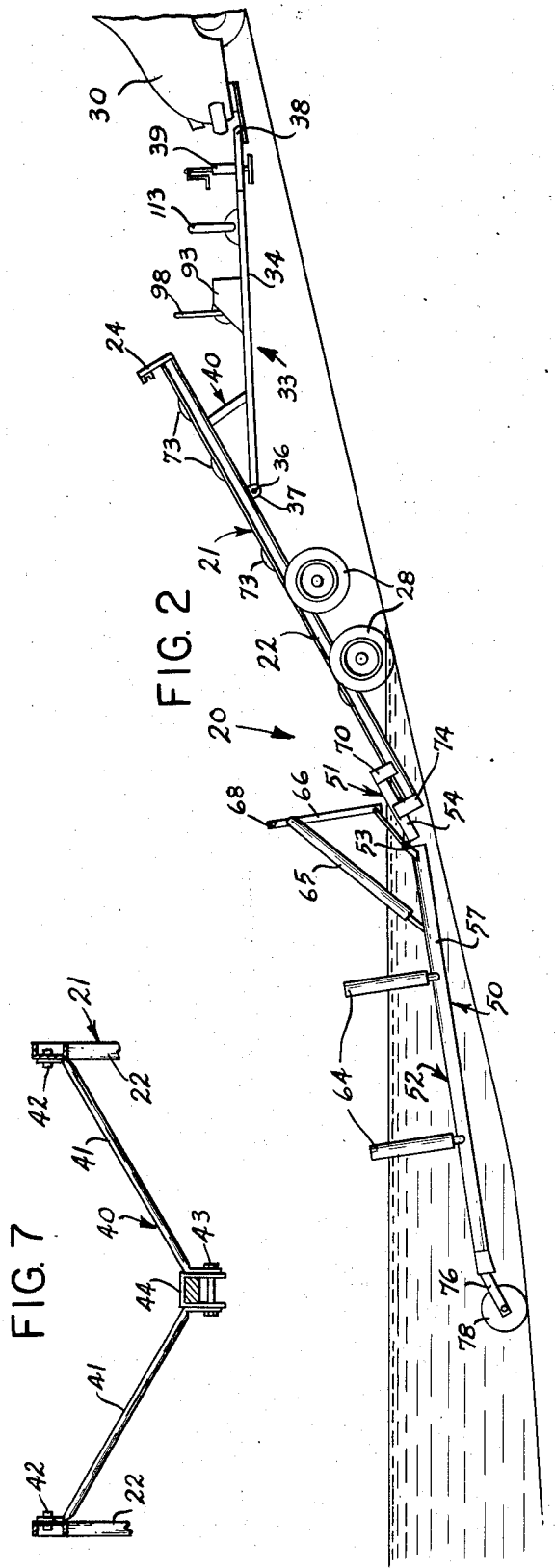

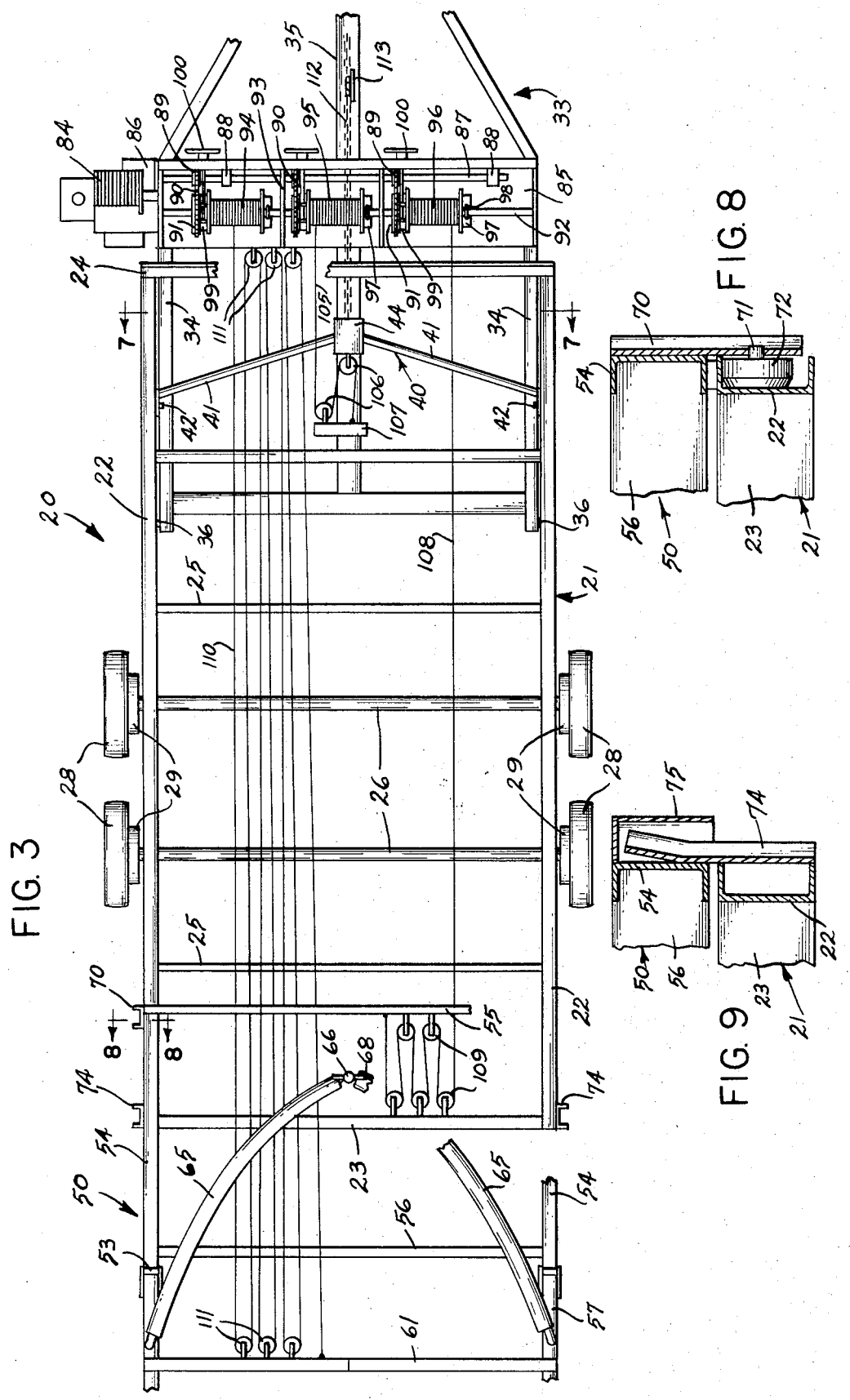

PATENTED JUL 30 1974 3,826,391

ARTICULATED BOAT LAUNCHING TRAILER

BACKGROUND OF THE INVENTION

1. Field of the Invention

This invention relates generally to trailers of various kinds and relates particularly to trailers for transporting marine vehicles and the like from one location to another across land and having apparatus for launching such vehicles into a body of water.

2. Description of the Prior Art

In the past, most boats were either work boats for harvesting products of the sea such as fish and the like or were a form of transportation for moving people and objects from one place to another across a body of water. These boats normally remained in the water from the time they were launched until their useful life was expended. When not in active use, these boats were anchored or were moored alongside a fixed structure such as a dock. With the increase in population, the available mooring areas became overcrowded and expensive to maintain.

In recent years, boats whose main purpose is for pleasure and recreation have become popular because such boats are of a size which carry only a few passengers, are relatively inexpensive to purchase, and because such boats are portable by means of a trailer. Since such boats are launched and removed from the water each time they are used, the need for docking facilities and the inherent expense associated therewith is eliminated. However, boats which can be successfully transported by means of a trailer are necessarily limited by the existing rules, regulations and conditions of the roadways over which the boats must be moved. Vehicular traffic along public thoroughfares is limited to the width which is acceptable to state and local authorities. In most areas, vehicles in excess of 6 feet wide must be clearly marked as being a "wide load" and in some areas must be provided with separate leading and trailing vehicles to warn the public of the existing conditions. Normally vehicles in excess of 10 feet wide present a hazard to traffic and therefore are not allowed on the road except in extreme conditions and even then only during certain prescribed hours when normal traffic is light.

Many efforts have been made to provide boat trailers connected to a propelling vehicle by means of which a boat or other marine vehicle can be transported across land and then discharged from the trailer into a body of water. Some examples of these prior art trailers are the patents to Whalen U.S. Pat. No. 3,102,649; Williams et al. U.S. Pat. No. 3,032,353; Fulcher U.S. Pat. No. 3,097,755; Delay et al. U.S. Pat. No. 3,138,271; Horner U.S. Pat. No. 3,140,003; Dale U.S. Pat. No. 3,380,607; and Park U.S. Pat. No. 3,608,754. These prior devices have included trailers with telescoping or tilting portions for discharging a boat from the trailer into a body of water. However, most of these devices have required rollers of various kinds for moving the boat lengthwise of the trailer or the supporting wheels of the trailer have been immersed in water so that the boat floated free of the trailer.

Rollers for moving the boat lengthwise of the trailer are objectionable since they engage the boat only at widely spaced intervals so that the weight of the boat is supported at spaced points of contact. Besides having a detrimental effect on the surface finish of the boat, any weakness in the hull is accentuated and may cause the hull to be fractured or ruptured. Also due to the irregular configuration of the bottom of the boat, most of the rollers are arranged to engage the hull only in the area of the keel and cradles have been provided for engaging the boat when the boat is in fully stored position. Normally the only support for the boat while the boat is being removed from or placed on the trailer are the rollers along the keel and therefore the boat is unstable until it becomes buoyant or until the boat is located entirely on the trailer.

Trailers in which the supporting wheel structure has been immersed in water have not been satisfactory, particularly when towing relatively large boats. When towing boats up to approximately 12 feet in length, the weight problem has not been severe and therefore the brakes of the propelling vehicle have been sufficient to control the momentum of the trailer with a boat thereon without significant jackknifing. With larger boats, the momentum created by the weight of the boat and the weight of the trailer has dictated that separate brakes be supplied to the supporting wheels of the trailer and arranged to function simultaneously with or immediately prior to the operation of the brakes on the propelling vehicle so that the trailer is under the control of the operator of the propelling vehicle. If the wheels of the trailer are immersed in the water, the brakes associated therewith become wet and are rendered ineffective so that the trailer is no longer under the control of the operator of the propelling vehicle, especially when the boat is removed from the water. Also wheel bearings are adversely affected both by the water and the impurities therein, such as mud, sand, and other foreign particles in suspension. Foreign particles which are introduced into the wheel bearings cause the bearing surfaces to be scored and generate heat during movement of the trailer so that in a relatively short time the effectiveness of the wheel bearing is destroyed.

SUMMARY OF THE INVENTION

The present invention is a trailer for marine vehicles or the like including a main frame supported by ground-engaging wheels. A tilt frame is swingably connected to the main frame, and such tilt frame includes a tongue disposed generally along the longitudinal axis of the trailer. A yoke is swingably mounted on the main frame and is slidably carried by the tongue so that when the yoke is moved in one direction along the tongue, the main frame is tilted about the ground-engaging wheels. An articulated boat support frame is telescopically mounted on the main frame and apparatus is provided for shifting the boat supporting frame lengthwise relative to the main frame. The boat support frame includes front and rear portions hingedly connected together so that the rear portion is capable of swinging in a generally vertical direction relative to the front portion. A pair of support rollers are rotatably mounted on the rear portion of the boat support frame to follow the contour of a launching ramp or the bottom of a body of water. The rear portion of the boat support frame has a plurality of cradles for supporting the boat when the boat is on the trailer but permitting the boat to become buoyant and float off the rear portion of the boat support frame when such frame is telescoped into the water. The ground-engaging wheels for the main frame are not immersed in the water.

It is an object of the invention to provide a boat launching trailer having a main frame with a boat support frame telescopically mounted thereon and in which the boat support frame is articulated so that one portion of such frame can swing in a generally vertical direction relative to another portion thereof.

Another object of the invention is to provide a boat launching trailer mounted on ground-engaging wheels and having apparatus for launching a boat from the trailer without immersing the ground-engaging wheels in the water.

Another object of the invention is to provide a boat launching trailer for boats in excess of 20 feet in length and having either inboard or outboard propulsion systems and in which the boat is launched from the trailer without moving the boat lengthwise thereof.

BRIEF DESCRIPTION OF THE DRAWINGS

FIG. 1 is a side elevation illustrating one application of the invention in retracted position.

FIG. 2 is a side elevation to a reduced scale illustrating the invention in extended position.

FIG. 3 is a fragmentary enlarged top plan view thereof.

FIG. 7 is a section on the line 7—7 of FIG. 3.

FIG. 8 is an enlarged section on the line 8—8 of FIG. 3.

FIG. 9 is an enlarged section on the line 9—9 of FIG. 1.

DESCRIPTION OF THE PREFERRED EMBODIMENT

Figure 4:
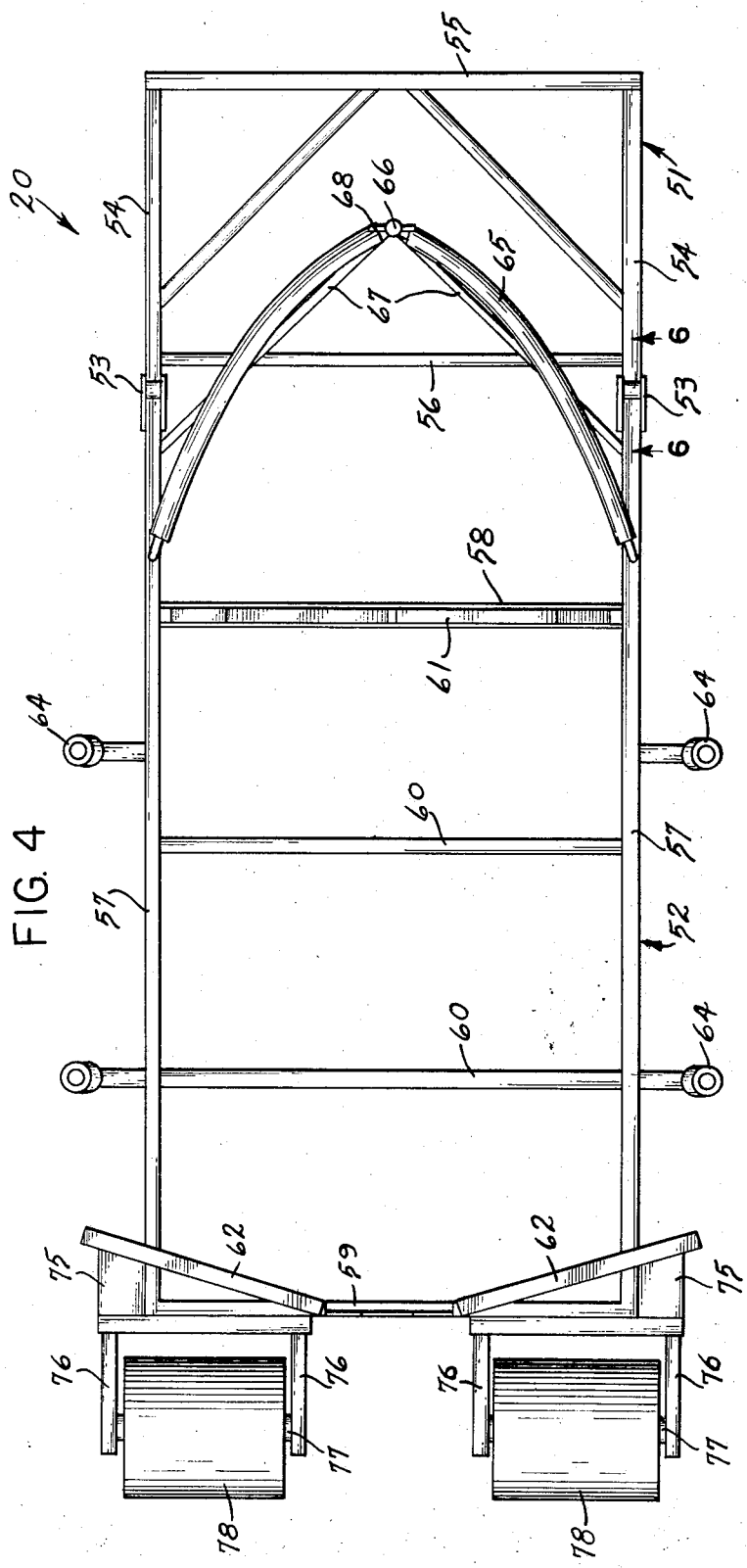
FIG. 4 is a top plan view of the boat support frame.
Figure 6:
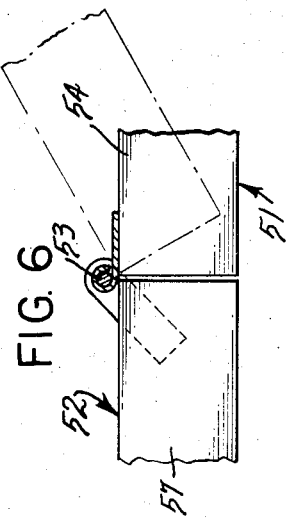
FIG. 6 is an enlarged section on the line 6—6 of FIG. 4.

With continued reference to the drawings, a boat launching trailer 20 is provided including a main frame 21. Such main frame is constructed of a pair of elongated generally parallel side beams 22 connected by a rear cross member 23, a front cross member 24, and a plurality of intermediate braces 25 for imparting strength and rigidity to the main frame. The side beams 22 normally are constructed of outwardly facing U-shaped channel members having upper and lower flanges connected by an intermediate web. The main frame 21 is movably supported above the ground in any desired manner, as by a pair of axles 26 connected to the main frame by conventional springs and having a ground-engaging wheel 28 rotatably mounted on each end of each axle. If desired, a single axle could be mounted on the main frame and a two-wheel truck could be mounted at each end of the axle to support the trailer. Preferably each of the ground-engaging wheels 28 is provided with brakes 29 adapted to be controlled from a remote position such as from a propelling vehicle 30. The brakes may be operated electrically, manually, or by fluid under pressure in any conventional manner.

During the normal operation of the trailer 20, the main frame 21 is maintained in a substantially horizontal position parallel with the ground. However, during launching and retrieving operations, it is desirable to tilt the main frame at an angle to the ground. In order to do this, a tilt frame 33 is provided having side members 34 and longitudinally extending tongue 35 disposed generally axially of the main frame 21. One end of each of the side members 34 is swingably connected by a pivot 36 to a lug 37 welded or otherwise attached to the main frame 21. At the forward end of the tilt frame 33, the side members 34 are connected to the tongue 35 and the tongue is provided with a hitch 38 by means of which the trailer is connected to the propelling vehicle 30. Preferably a jack or support stand 39 is carried by the tilt frame 33 to support the forward end of the trailer when the trailer is disconnected from the propelling vehicle.

As illustrated in FIGS. 3 and 7, a generally V-shaped yoke 40 is provided having a pair of upwardly and outwardly extending arms 41, the upper ends of which are swingably connected by pivots 42 to the side beams 22 of the main frame and the lower ends of which are connected by bolt 43 to a slide member 44 reciprocably mounted on the tongue 35. The slide member 44 is adapted to be removed lengthwise of the tongue in a manner to be described later so that the yoke 40 will tilt the main frame 21 to an inclined angle relative to the ground.

Figure 5:
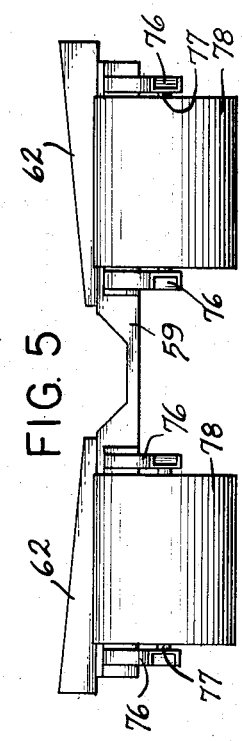
FIG. 5 is an end elevation.

A boat support frame 50 is telescopically mounted on the main frame 21 and such boat support frame includes a forward portion 51 and a rear portion 52 swingably connected together by hinges 53 to permit relative movement in a generally vertical direction. The forward portion 51 includes a pair of side members 54 connected by front and rear cross members 55 and 56. The rear portion 52 includes a pair of elongated side members 57 connected by front and rear cross members 58 and 59, as well as a plurality of braces 60 for imparting strength and rigidity to the boat support frame. The front and rear cross members 58 and 59 of the rear portion 52 support cradles 61 and 62 having upper surfaces shaped to the corresponding portion of the hull of a boat 63. Preferably the rear cradle 62 is divided, as illustrated in FIG. 5, to accommodate the propeller shaft of a boat having an inboard power plant.

Intermediate the ends of the rear portion 52, a pair of spaced, upwardly extending padded posts or fenders 64 are mounted on each of the side members 57 to guide the boat onto and off of the cradles 61 and 62. Adjacent to the front end of the rear portion 52, an upwardly and inwardly curved padded brace 65 is provided the lower ends of which are welded or otherwise attached to the side members of the rear portion 52. The upper central portion of such brace is welded or otherwise attached to an upright stanchion 66 the lower end of which is connected to the rear portion 52 in any desired manner, as by braces 67. The upper portion of the stanchion 66 which is located above the padded brace 65 is provided with a cross pin or cleat 68 to which the bow painter 69 of the boat 63 is connected. Securing the bow painter to the cleat 68 prevents the boat from drifting away from the trailer when the boat is buoyant during launching and retrieving operations.

In order to telescopically mount the boat support frame 50 on the main frame 21, the forward portion 51 of such boat support frame is provided with a pair of downwardly extending lugs 70 one of which is welded to each of the sides 54 and extends downwardly adjacent to the side beams 22 of the main frame. At the lower end of the lugs 70, an inwardly extending pivot pin 71 is provided and each of such pins rotatably receives a roller 72 adapted to engage at least one of the flanges of the side beams 22.

It is important that the boat support frame 50 be spaced slightly above the main frame 21 to reduce the area of frictional contact during the telescoping movement of the boat support frame relative to the main frame. In order to do this, anti-friction apparatus, such as rollers or the like, can be provided on either the main frame 21 or the boat support frame 50; however, as illustrated, the main frame 21 is provided with a plurality of spaced arcuate bearing members 73 which engage the bottom of the boat support frame 50 in spaced locations. A pair of upwardly extending guides 74 are welded or otherwise attached to the side beams 22 of the main frame adjacent to the rear cross member 23 to guide the boat support frame 50 onto and off of the main frame 21.

At the rear of the boat support frame 50, the rear cross member 59 of the rear portion 52 extends outwardly beyond the side members 57 at each side and is connected to forwardly extending housings 75 which are located exteriorly of the guides 74 when the boat support frame 50 is fully retracted onto the main frame 21. When the boat support frame 50 is being extended from the main frame 21, it is desirable that the end of the rear portion 52 follow the contour of the launching ramp or the bottom of a body of water into which the boat is being launched. In order to do this, a plurality of pairs of outwardly and downwardly extending mounting brackets 76 are welded or otherwise attached to the rear cross member 59 if the rear portion 52 and each pair of brackets receives an axle 77 on which a rotating drum 78 is mounted. As illustrated, a pair of drums are provided which are spaced apart a distance sufficient to accommodate the propeller and rudder of a boat having either an outboard or an inboard power plant. Preferably the drums 78 are water-tight and are filled with a buoyant material such as air which, while not sufficiently buoyant to cause the rear portion 52 of the boat support frame 50 to float, is sufficient to reduce the negative buoyancy of the boat support frame to make it easier to move the boat support frame, particularly when the drums are rolling through mud, slit or other relatively soft material.

In order to tilt the main frame 21 relative to the tilt frame 33, as well as to telescope the boat support frame 50 onto and off of the main frame 21, a power plant 84 is mounted on a platform 85 fixed to the tilt frame 33 and such power plant is adapted to drive a conventional reduction gearing mechanism 86 in any desired manner. The reduction gearing mechanism is adapted to rotate a drive shaft 86 carried by bearings 88 supported by the platform 85. A plurality of drive sprockets 89 are keyed or otherwise attached to the drive shaft 87 and each of such drive sprockets is connected by a drive chain 90 to a driven sprocket 91. The driven sprockets are freely rotatably mounted on a shaft 92 carried by support plates 93 mounted on the platform 85. A plurality of winches 94, 95 and 96 are rotatably mounted on the shaft 92 and each of such winches is located adjacent to a separate driven sprocket 91. A clutch mechanism 97 having an operating handle 98 is associated with each of the winches 94–96 and is adapted to selectively connect a winch with its associated driven sprocket. Normally the driven sprockets 91 are rotated by the drive shaft 87 as long as the power plant 84 is operated but the associated winches remain stationary until the clutch mechanisms 97 are operated. Preferably an adjustable frictional brake mechanism 99 controlled by an operating wheel 100 is associated with each of the winches to keep a slight strain on the winch cables at all times but can be operated to prevent the winches from rotating.

With reference to FIG. 3, in order to tilt the main frame 21 relative to the ground, the winch 95 has a wire rope or cable 105 which extends through a block and tackle 106 located between a cross member 107 and the slide member 44. Such cross member is welded or otherwise attached to the tongue 35 in spaced relationship to the slide member. The end of the cable 105 is secured to the cross member 107. When the clutch mechanism 97 of the winch 95 is operated, such winch is rotated in a direction to wind the cable on the winch and cause the slide member 44 to move rearwardly along the tongue 35 toward the cross member 107. Rearward movement of the slide member causes the tilt frame 33 to swing about the pivots 36 and simultaneously the yoke 40 causes the forward end of the main frame to swing upwardly about the rear axle 26 until the rear cross member 23 is substantially in engagement with the ground. In this position the brake mechanism 99 of the winch 95 is tightened and the clutch mechanism 97 is declutched.

After the main frame has been tilted, clutch mechanism 97 of the winch 96 is operated to cause the boat support frame 50 to be telescopically extended rearwardly from the main frame. The winch 96 is provided with a wire rope or cable 108 which extends through a block and tackle 109 extending between the rear cross member 23 of the main frame and the front cross member 55 of the forward portion 51 of the boat support frame. Operation of the winch 96 causes the cable 108 to be wound onto such winch and causes the forward portion of the boat support frame to move rearwardly toward the rear portion of the main frame.

In order to return the boat support frame onto the main frame when the boat 63 is being retrieved, the winch 94 is provided with a wire rope or cable 110 which extends through a block and tackle 111 connected between the front cross member 58 of the rear portion 52 of the boat support frame and the platform 85 carried by the tilt frame 33. The end of the cable 110 is secured to the front cross member 58 of the boat support frame so that when the winch 94 is operated such cable is wound thereon and the boat support frame 50 is drawn onto the main frame 21.

It is conceivable that the yoke 40 could be located substantially at right angles to the main frame 21 when the main frame is tilted and would therefore resist forward movement of the slide member which is necessary in order to return the main frame 21 to a generally horizontal position. In order to move the slide member 44 in a forward direction, a chain 112 is welded or otherwise secured to the slide member 44 and such chain extends forwardly across the platform 85 to a conventional chain hoist 113 mounted on the tongue 35. Such hoist can be operated manually or by fluid under pressure from a source of supply.

In the operation of the device, the propelling vehicle 30 pulls the trailer 20 with the boat 63 thereon to a launching site and then backs the trailer toward the body of water until the wheels 28 are at the water's edge. In this position the brakes of the propelling vehicle and the brakes 29 of the trailer are set so that the propelling vehicle and the main frame remain substantially stationary. The power plant 84 is started and the clutch mechanism 97 of the winch 95 is operated to pull the slide member 44 rearwardly and tilt the forward portion of the main frame 21 upwardly about the rearmost axle 26 until the main frame is disposed at a predetermined angle or until the rear cross member 23 is substantially in engagement with the ground. Thereafter the winch 96 is operated to cause the boat support frame 50 to be extended longitudinally from the main frame 21. When the boat support frame is being extended, the drums 78 engage the surface of the ramp or the bottom of the body of water so that the rear end of the rear portion 52 follows the contour thereof. Due to the inclined angle of the main frame during this movement, the rear portion 52 of the boat support frame swings about the hinges 53 in a generally vertical direction relative to the forward portion 51. As the boat support frame 50 is extended into the water, the boat 63 becomes buoyant and floats off of the cradles 61 and 62. At this time, the boat is secured only bh the bow painter 69 connected to the cleat 68. When the bow painter is cast off, the boat 63 is free to move and the boat support frame 50 is returned to the main frame 21.

When the boat 63 is to be retrieved, the boat support frame 50 again is telescopically extended into the water. The helmsman of the boat steers between the fenders 64 until the bow engages the padded brace 65, at which time the bow painter is connected to the cleat 68. Thereafter the winch 94 is operated to draw the boat support frame 50 onto the main frame 21. Initial forward movement of the boat support frame causes the boat to engage the cradles 61 and 62 so that the boat support frame 50 supports the boat. When the center of gravity of the combined boat and boat support frame passes the rear axle 26, the main frame 21 will begin to tilt downwardly and move the slide member 44 forwardly. In order to do this, the brake mechanism 99 of the winch 95 is released slightly while maintaining a drag on the winch so that the main frame is lowered gently to a substantially horizontal position. If necessary, the chain hoist 113 can be operated to provide initial forward movement of the slide member 44.

I claim:

1. A trailer for transporting a boat over land and launching the same into a body of water comprising a main frame having an axle supported by ground-engaging wheels, a tilt frame swingably connected to said main frame forwardly of said axle, means on said tilt frame for tilting said main frame from a generally horizontal position to an inclined position about said axle, an articulated boat support frame having front and rear portions, hinge means connecting said rear portion to said front portion for allowing said rear portion to be swingably movable in a generally vertical direction, said boat support frame being telescopically mounted on said main frame by said front portion, means for mounting a boat on the rear portion of said boat support frame, and means for extending and retracting said boat support frame relative to said main frame.

2. The structure of claim 1 in which said means for tilting said main frame includes a tongue on said tilt frame, a slide member movably mounted on said tongue, yoke means carried by said slide member and having portions swingably connected to said main frame in spaced relation to said tilt frame connection, and means for moving said slide member to cause said main frame to tilt.

3. The structure of claim 2 in which said means for moving said slide member includes a selectively operated winch.

4. The structure of claim 1 including at least one roller mounted on said boat support frame to cause a portion of said boat support frame to swing about said hinge.

5. The structure of claim 1 including guide means for guiding said boat support frame relative to said main frame when said boat support frame is extended and retracted.

6. The structure of claim 1 in which said means for extending and retracting said boat support frame includes at least one selectively operable winch.

7. In a boat launching trailer having a main frame supported by an axle disposed between ground-engaging wheels, a boat support frame telescopically mounted on said main frame, and means for moving said boat support frame relative to said main frame; the improvement comprising a tilt frame pivotally connected to said main frame forwardly of said axle for tilting said main frame about said axle, said boat support frame having front and rear portions, hinge means connecting said rear portion to said front portion whereby said rear portion is allowed to have relative swinging movement in a generally vertical direction, anti-friction means mounted on said rear portion for engaging the ground when said boat support frame is extended, and means on said rear portion for supporting a boat.

8. The structure of claim 7 in which said anti-friction means includes at least one roller.

* * * * *